United States Patent [19]
Severinsson

[11] Patent Number: 5,103,944
[45] Date of Patent: Apr. 14, 1992

[54] WEDGE-TYPE ACTUATOR FOR ACTUATING DRUM BRAKES

[75] Inventor: Lars M. Severinsson, Hishult, Sweden

[73] Assignee: Haldex AB, Sweden

[21] Appl. No.: 287,556

[22] Filed: Dec. 20, 1988

Related U.S. Application Data

[63] Continuation of Ser. No. 98,967, Sep. 21, 1987, abandoned, which is a continuation-in-part of Ser. No. 860,041, May 6, 1986, Pat. No. 4,699,256.

[30] Foreign Application Priority Data

May 10, 1985 [SE] Sweden ................... 8502335

[51] Int. Cl.⁵ ................................. F16D 51/22
[52] U.S. Cl. ......................... 188/343; 24/110; 192/93 C
[58] Field of Search ............... 188/343; 192/93 C; 24/110

[56] References Cited

U.S. PATENT DOCUMENTS

| | | | |
|---|---|---|---|
| 500,289 | 6/1893 | McKillip | 192/93 C X |
| 1,799,229 | 4/1931 | Hanna | 74/110 |
| 1,848,775 | 3/1932 | Girling | 188/343 |
| 2,953,344 | 9/1960 | Yancey | 74/110 |
| 3,395,584 | 8/1968 | Cox et al. | 188/343 X |
| 3,511,103 | 5/1970 | Cox, Jr. | 188/343 |
| 3,707,845 | 1/1973 | Mitton | 74/110 X |
| 3,869,025 | 3/1975 | Oliver | 188/79.5 GE |

FOREIGN PATENT DOCUMENTS

| | | |
|---|---|---|
| 0255428 | 2/1988 | European Pat. Off. |
| 2356075 | 6/1974 | Fed. Rep. of Germany |
| 402335 | 4/1973 | Sweden |
| 1287980 | 9/1972 | United Kingdom |

Primary Examiner—George E. A. Halvosa
Attorney, Agent, or Firm—Laurence R. Brown

[57] ABSTRACT

A wedge-type actuator for actuating drum brakes including guide rollers positioned between the wedge and a plunger that contacts the leading brake shoe. The guide rollers are carried between a guiding surface on the wedge and a guiding surface in the housing, to take up the reaction forces caused by the larger actuation forces needed to operate the trailing brake shoe. The disclosed arrangement provides more even braking forces, and thereby results in more even brake shoe wear.

16 Claims, 3 Drawing Sheets

WEDGE-TYPE ACTUATOR FOR ACTUATING DRUM BRAKES

CROSS REFERENCE TO RELATED APPLICATION

This application is a continuation of application Ser. No. 07/098,967, filed Sept. 21, 1987, now abandoned, which is a continuation-in-part of application Ser. No. 06/860,041, filed May 6, 1986, now U.S. Pat. No. 4,699,256.

TECHNICAL FIELD

This invention relates to a wedge-shaped actuator for drum brakes, especially for road vehicles, and includes a brake cylinder push rod axially movable in a housing, plungers axially movable in the housing substantially perpendicularly to the push rod, and force transmitting rollers between parallel wedge surfaces at the end of the push rod and on the respective plungers, so that the plungers are pushed apart upon axial movement of the push rod.

BACKGROUND OF THE INVENTION

Drum brakes of the kind referred to are well known in the art. The plungers forming part of the brake actuation system are intended for cooperation with the ends of a pair of opposed, pivoted brake shoes to urge the brake shoes apart and against the interior annular surface of a rotating brake drum mounted on a wheel of the vehicle. Numerous examples from the patent literature could be given; just one and a rather typical example is DE-B-23 56 075.

A well known drawback with presently known wedge brakes of the above-mentioned type is the uneven distribution of braking forces between the two brake shoes and the resulting uneven brake lining wear. Depending upon the direction of rotation of the wheel to be braked, one of the brake shoes is "leading" and the other one "trailing," the wedge-actuated brake systems of the prior art involve a "floating" wedge, resulting in lack of control of the proper distribution of the braking forces to the respective brake shoes.

SUMMARY OF THE INVENTION

The basic drawback of presently known wedge-actuated brake systems, as described above, is eliminated by the present invention. A compact, inexpensive, and reliable design is provided wherein the push rod is guided within the housing for complete control over the reaction forces from the plungers. Guide rollers are arranged between plane surfaces at the end of the push rod and in the housing, respectively, to guide the movement of the push rod, the plane surfaces being parallel with each other and with the axis of the push rod. A guide roller is preferably positioned on each side of the force transmitting roller.

It is common to provide a roller cage for the proper guiding of the force transmitting rollers in conventional designs. According to one aspect of the invention, both the guide rollers and the force transmitting rollers are arranged in suitably shaped openings in a roller cage.

The reaction forces in such a wedge-actuated brake system are substantial, and long life with safe operation is essential, which means that all the mentioned surfaces and rollers have to be strong and highly wear-resistant. In order not to require a costly material for the whole housing, a separate, high-quality, wear-resistant reaction plate is positioned within the housing to serve as the housing portion of the plane surface for the guide rollers.

Briefly stated, in accordance with another aspect of the present invention, a brake shoe actuation apparatus is provided for actuating pivotable brake shoes carried within a rotatable brake drum. A pair of opposed, spaced plungers positioned within the brake drum are each engagable with a respective brake shoe and are movable relative to each other along respective plunger movement directions to move the brake shoes into braking contact with the brake drum. The plungers have inner plunger faces that are inclined to the respective plunger movement directions. A wedge is positioned between the plungers and is movable transversely relative to the plunger movement direction and along a wedge movement direction. The wedge includes wedge surfaces that are substantially parallel with and opposed to the respective plunger inner faces. An arrangement for actuating the wedge and for moving it in the wedge movement direction is also provided. Force transmitting rollers are positioned between and in contact with the respective opposed plunger inner faces and the wedge surfaces for rolling contact therewith, and for transmitting movement of the wedge to the plungers to move the plungers relative to the brake drum and cause movement of the brake shoes relative to the brake drum. A stationary guide surface is positioned opposite at least one wedge surface. A guide roller is positioned on at least one side of the wedge and between the wedge and a plunger inner face, and is in rolling contact with the wedge and with the stationary guide surface for guiding the movement of the wedge relative to the guide surface.

BRIEF DESCRIPTION OF THE DRAWINGS

The invention will be described in further detail below, reference being made to the accompanying drawings.

DESCRIPTION OF THE PREFERRED EMBODIMENTS

Figure 1:
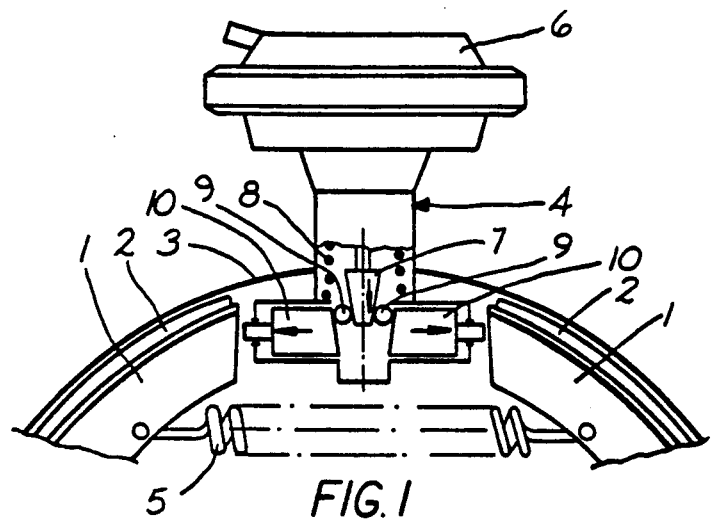
FIG. 1 is a schematic side view, partly in section, of a known wedge brake arrangement according to the state of the art.

A typical conventional wedge brake arrangement as presently used for heavy road vehicles is shown in FIG. 1. Brake shoes 1 provided with brake linings 2 are movable into braking engagement with a brake drum 3, rotating with a wheel (not shown) of the vehicle, by means of a so called wedge brake unit 4, whereas the return movement of the shoes is performed by a draw spring 5.

The wedge brake unit 4 includes a brake fluid operated brake cylinder 6, whose outgoing push rod is in the form of a wedge 7. There is a return spring 8 of the helical compression type for the push rod. Rollers 9 are arranged between the wedge 7 and plungers 10, and the plungers are axially movable substantially perpendicularly to the direction of movement of wedge 7 so as to push the brake shoes 1 into braking engagement with the brake drum 3. The inclined of the plunger ends cooperating with the rollers 9 is the same as that of the respective opposed surfaces of the wedge 7, so that the rollers 9 rollers 9 roll between parallel surfaces. In practical embodiments the rollers 9 are provided with roller cages or similar carrier means, which for the sake of simplicity are not shown in FIG. 1.

Depending on the direction of rotation of the brake drum 3 one of the brake shoes 1 will be "leading", whereas the other one will be "trailing", when the two plungers 10 are pressed apart by the wedge 7 via the rollers 9 for performing a braking operation. This means that the arrangement can be characterized as "floating" and that no control over the force transmission to the respective brake shoes is attained, resulting in uneven distribution of the brake force and in uneven brake lining wear.

Figure 2:
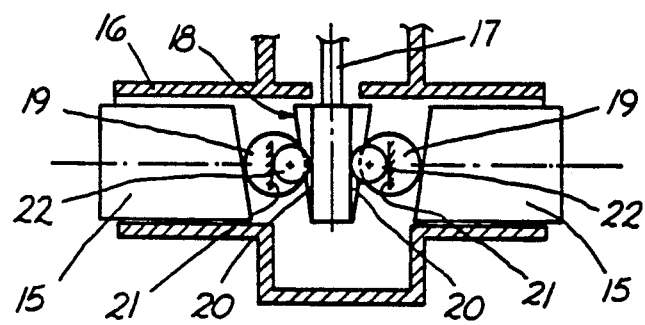
FIG. 2 is a corresponding, but enlarged side view showing a wedge brake actuator and associated structure in accordance with one aspect of the invention.

A solution according to the invention is illustrated in FIG. 2, where only those parts of the general arrangement according to FIG. 1 which are of interest for a proper understanding of the invention are shown.

As in the conventional arrangement, two plungers 15 are axially movable in a housing 16. A brake cylinder push rod 17 is axially movable perpendicularly to the axis of plungers 15. The push rod 17 is provided with a wedge 18, and force transmitting rollers 19 are positioned between the respective wedge surfaces and a parallel end surface of the opposed plunger 15, giving the function described above with reference to FIG. 1.

However, the wedge 18 of the present invention is also provided with surfaces 20 parallel with each other and with the axis of the push rod 17, and corresponding parallel guide surfaces 21 are fixedly positioned within the housing 16 in any suitable way. Guide rollers 22 are arranged between these surfaces 20, 21. Rollers 19 and 22 need to be properly guided, and a roller cage or the like is shown in FIGS. 3 and 4, and will be described hereinafter.

The control over the wedge that is lacking in the conventional arrangement according to FIG. 1 is completely obtained with the modification disclosed in simplified form in FIG. 2, where the guide rollers 22 will provide the necessary control over the reaction forces in the arrangement.

Figure 3:
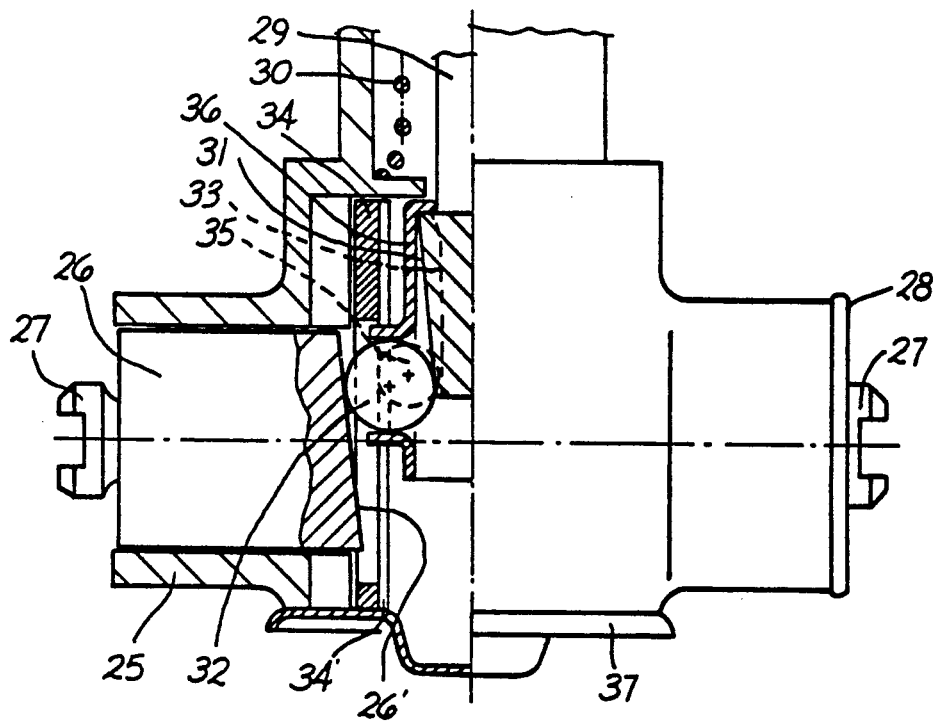
FIG. 3 is an enlarged side view, partly in section, of one embodiment of a wedge brake arrangement according to the present invention.
Figure 4:
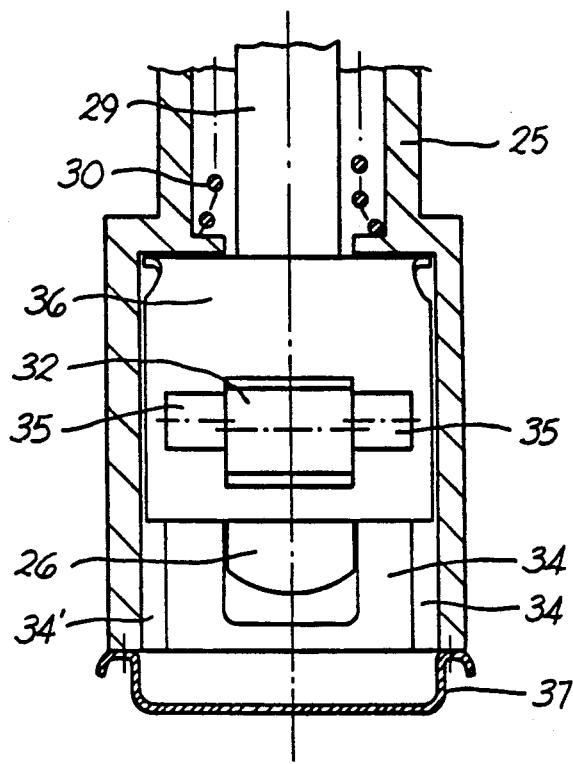
FIG. 4 is a fragmentary sectional view taken perpendicularly through FIG. 3 to show the relative positions of several of the elements shown in FIG. 3.

A practical embodiment of a structure of the modified kind disclosed generally in FIG. 2 is shown in FIGS. 3 and 4. In FIG. 3 only the left half of the structure is sectioned, but the contents of the right half is the same as that shown.

In a housing 25, a plunger 26 is axially movable. At its end extending out of the housing 25 the plunger 26 is provided with a member 27 for engaging the respective brake shoe (see FIG. 1). A bellows 28 (shown at the right in FIG. 3) between the housing 25 and the member 27 prevents moisture, dirt and the like from entering the housing 25. Only a smaller part of the plunger 26 is sectioned; conventionally, a slack adjuster is provided therein but forms no part of the present invention and is not disclosed or described because those skilled in the art are familiar with the structure of such slack adjusters. In order to take full advantage of the arrangement according to the invention, the slack adjusters in the respective plungers 26 need to be synchronized in a way not shown.

A brake cylinder push rod 29 is axially movable in the housing 25 perpendicularly to the plunger 26. A return spring 30 of the helical compression type is provided for the push rod 29. At the end of the push rod 29 there is a central wedge surface 31 cooperating with a plunger end surface 26' parallel with the wedge surface 31.

On either side of the central wedge surface 31 at the end of the push rod 29 is a guide surface 33 parallel with the axis of the push rod 29. A hardened reaction plate 34 is positioned within the housing 25 and in parallel with the guide surfaces 33. A guide roller 35 is positioned between the guide surface 33 and the reaction plate 34. Positive guiding for the guide roller 35 in the direction of the axis of push rod 29 is provided by a small flange 34' on the reaction plate 34 or on the housing 25.

A roller cage 36 provides the necessary carrier for the three rollers 32 and 35 (see FIG. 4) at either side of the push rod 29. A cover 37 is attached to the bottom of the housing 25.

Figure 5:
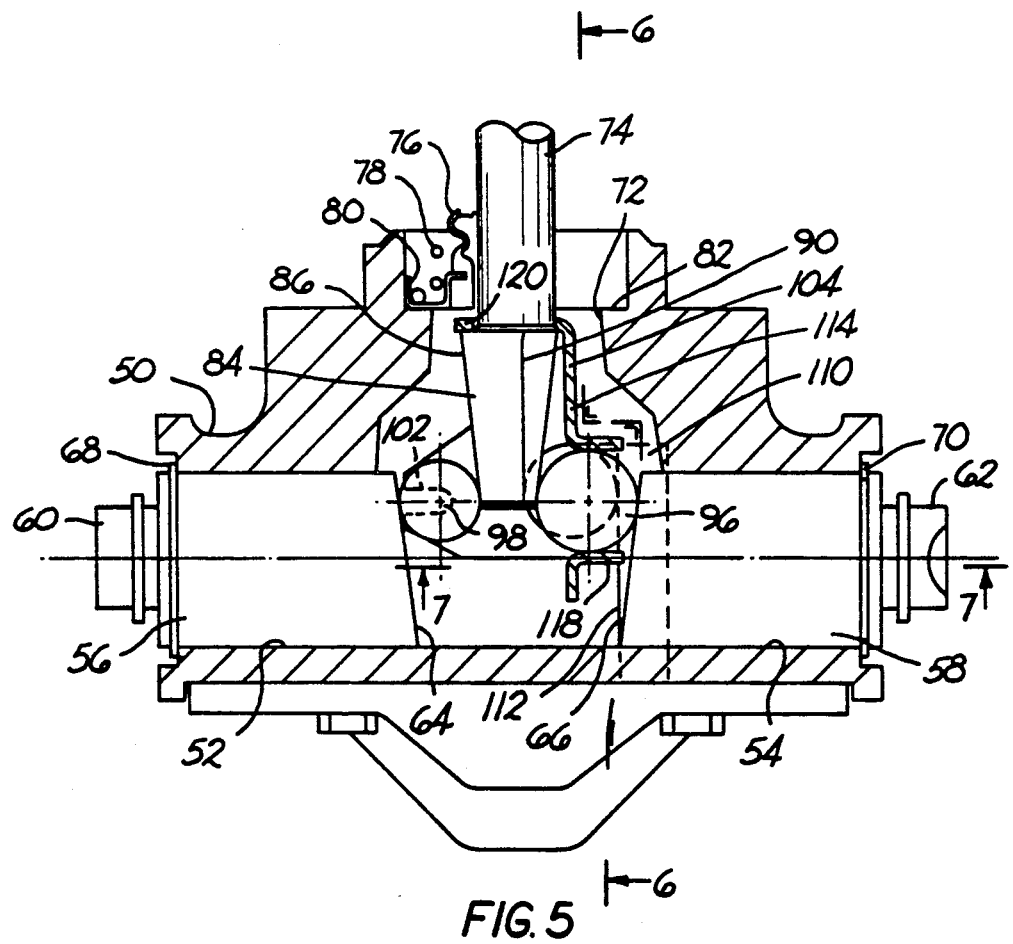
FIG. 5 is a cross-sectional view of another embodiment of the present invention, in which a guide roller is provided on only one side of the push rod.
Figure 6:
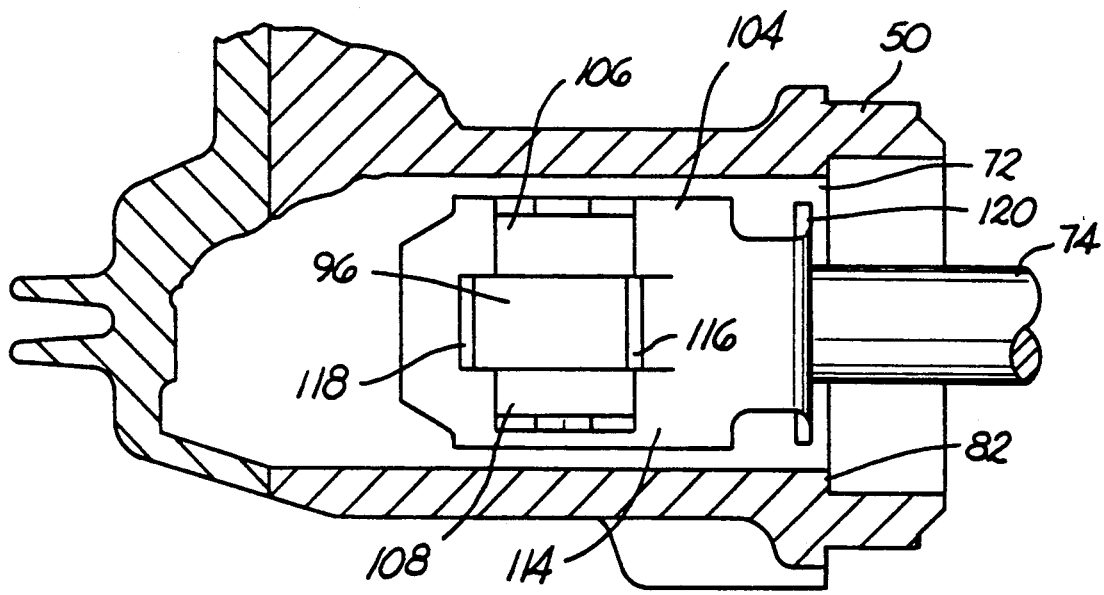
FIG. 6 is a cross-sectional view taken along the ling 6—6 of FIG. 5.
Figure 7:
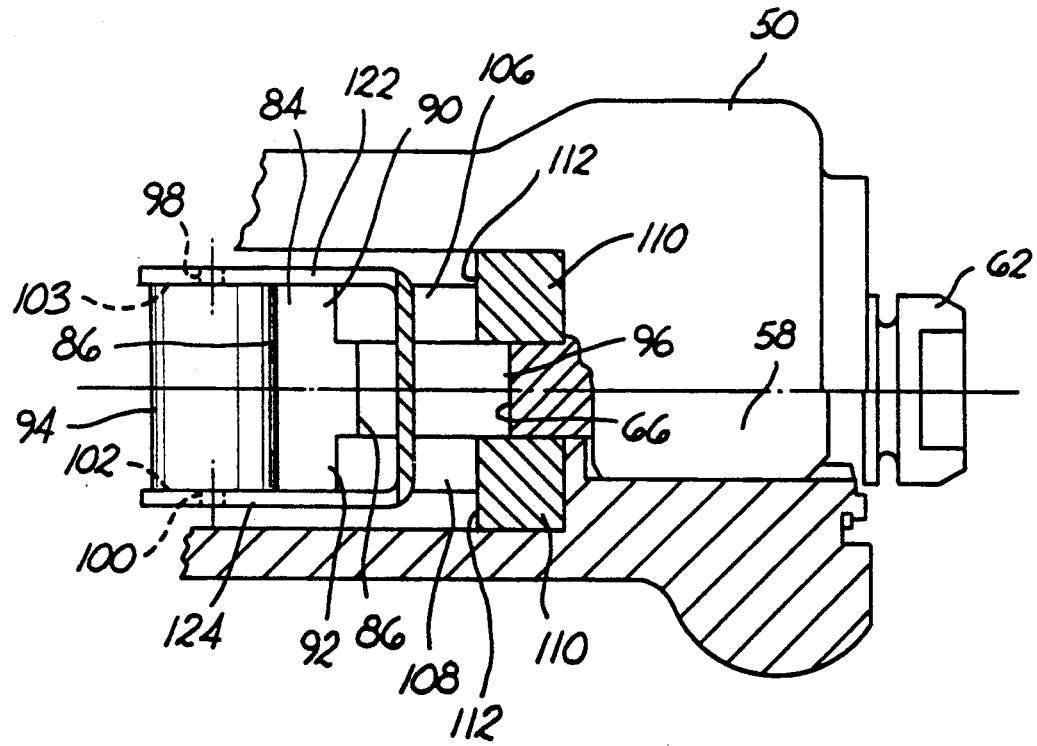
FIG. 7 is a fragmentary view, partially in section, taken along the line 7—7 of FIG. 5.

Another embodiment of the present invention is illustrated in FIGS. 5 through 7, in which a wedge-brake actuation apparatus is disclosed wherein guide rollers are provided on only one side of the push rod. This embodiment provides a distinct advantage over the embodiment illustrated in FIGS. 2 through 4 in that the parts can be provided in a smaller housing, and consequently the structure can be incorporated within a smaller brake drum, thereby rendering it suitable for use with smaller vehicle than trucks or other heavy road vehicles.

Referring now to FIG. 5, the embodiment illustrated includes a housing 50, which defines two opposed and spaced coaxial cylinders 52, 54 each of which slidably carries a plunger 56, 58, respectively. Each of plungers 56, 58 includes an outer, brake shoe-contacting member 60, 62, respectively, on its outwardly facing surface, and each plunger includes an inclined inner face 64, 66, respectively, on its innermost surface. Stop rings 68, 70 are provided adjacent the outermost surface of the respective plungers to limit inward movement thereof.

Housing 50 also includes an opening 72 that has an axis that extends substantially perpendicular to and intersects the common axis of cylinders 52 and 54. Opening 72 permits the passage therethrough of a push rod 74, which extends from a brake cylinder (not shown). Push rod 74 is enclosed by a cylindrical, accordian-type protective sleeve 76, only part of which is illustrated, to prevent the entry of dirt and foreign material into the housing through opening 72. A return spring 78, only part of which is illustrated, is provided to act on the outer end (not shown) of push rod 74 to bias it into an outer, non-brake-actuating position. The inner end of spring 78 is received in an annular spring retainer 80, that seats against an annular flange 82 that is concentric with opening 72.

The innermost end of push rod 74, relative to housing 50, carries a wedge 84 that is of generally rectangular cross-section, as best seen in FIG. 7. Wedge 84 includes a flat, inclined first wedge surface 86 that is in substantially parallel relationship with and opposed to inclined inner face 64 of plunger 56, and is inclined relative to the axis of push rod 74. The opposite side of wedge 84 includes a second wedge surface 88, that is narrower than the first wedge surface 86, and is also a flat surface that is inclined relative to the push rod axis and is substantially parallel to inclined inner surface 66 of plunger 58. Preferably, the angles of inclination of the respective opposed wedge surfaces are the same, although, if desired, the angle of the one pair of surfaces can be different than that of the other pair. Outwardly of second wedge surface 88 and on each side thereof are generally rectangular planar surfaces 90, 92 that extend along the length of wedge 84 and are substantially parallel with the push rod axis. The two outer surfaces 90, 92 define guide roll surfaces, as will hereinafter be further explained.

Between each of the wedge surfaces 86, 88 and the respective inner faces 64, 66 of plungers 56, 58, a respective force transmitting roller 94, 96 is positioned and is in contact with the respective opposed surfaces, so that it can roll along the respective opposed surfaces as wedge 84 is moved along the wedge movement direction, which is along the push rod axis. As shown, the respective force transmitting rollers 94, 96 are of unequal diameters, which, again, contributes to a smaller total volume of the parts within housing 50, thereby permitting the housing to be made smaller in size, so that it can fit within a smaller diameter brake drum. However, if desired, the diameters of the force transmitting rollers can be equal.

Force transmitting roller 94 extends across substantially the entire width of wedge surface 86 and includes stub end shafts 98, 100 that are rotatably and slidably received in respective transverse slots 102, 103 that are provided in opposite sides of roller cage 104. The slots are so configured and arranged that the axis of force transmitting roller 94 can move toward and away from the axis of push rod 74, when wedge 84 moves along the push rod axis, although the roller is constrained to move along the push rod axis together with roller cage 104.

Force transmitting roller 96, which is positioned on the opposite side of wedge 84 from force transmitting roller 94, is of a narrower width, as best seen in FIG. 7, and bears against narrower second wedge surface 88 and the corresponding inner surface 66 of plunger 58. The opposed lateral ends of force transmitting roller 96 each carry a guide roller 106, 108, respectively, which are in rolling contact with respective guide roll surfaces 90, 92 on wedge 84. As best seen in FIGS. 5 and 7, the respective guide rollers 106, 108, although co-axial with each other, are offset from the axis of second force-transmitting roller 96. Additionally, a reaction plate 110 is positioned within housing 50 to define a second guide roller guide surface 112 that extends in a direction parallel with the axis of push rod 84. The respective guide roller guide surfaces 90, 92, and 112 guide each of guide rollers 106, 108, respectively, for movement in a direction parallel with the axis of push rod 74, and thereby guide and provide support for push rod 74 and wedge 84. Preferably, reaction plate 110 is made from a high quality, hardened steel, or the like, for long wear. Alternatively, if desired, second guide surface 112 can be defined by a surface formed integrally within the interior of housing 50, although to do so would require that the entire housing be made of a wear-resistant material, which would render the housing more expensive. As is apparent from FIGS. 5 and 7, reaction plate 110 includes a suitable opening to permit force transmitting roller 96 to extend therethrough and to contact inner face 66 of plunger 58.

Roller cage 104 supports second force transmitting roller 96, as well as the adjacent guide rollers 106 and 108, in a floating relationship be defining a cage end wall 114 (see FIG. 5) that includes an opening defined by a pair of outwardly extending flanges 116, 118 to receive and carry the second force transmitting roller and associated guide rollers for movement along with the movement of the cage, as the cage moves in an up and down direction as viewed in FIG. 5. Further, and as clearly shown in FIGS. 5 and 6, roller cage 104 includes a collar 120 that fits around a major portion of the periphery of push rod 74, and includes a pair of spaced, parallel sidewalls 122, 124 that include slots 102, 103, respectively, that rotatably and slidably receive stub shafts 98, 100 of force transmitting roller 94.

The embodiment illustrated in FIGS. 5 through 7 operates in a manner similar to that of the embodiment illustrated in FIGS. 2 through 4, in that downward movement of push rod 74, as viewed in FIG. 5, by actuation of the brake cylinder (not shown) causes wedge 84 to move downwardly, thereby urging the respective force transmitting rollers 94 and 96 downwardly along the push rod axis, and outwardly in opposite directions, relative to the push rod axis, to thereby cause the respective plungers 56 and 58 to each move outwardly relative to housing 50, and thus to push the associated brake shoes (not shown) against the brake drum inner surface (not shown) to provide the desired braking effect. As the force transmitting rollers move in the direction just described, guide rollers 106 and 108 are carried between the guide surfaces 90 and 92 of wedge 84 and opposed guide surface 112 on reaction plate 110, and serve to provide a stabilization of the movement of push rod 74. In the orientation of the parts as illustrated in FIG. 5, first force transmitting roller 94 and its associated plunger 56 are intended to actuate the trailing brake show, which would correspond with the brake shoe 1 illustrated in the left-hand portion of FIG. 1 when the brake drum there shown is rotating in the clockwise direction. Thus, the brake shoe 1 on the right-hand side of that drawing Figure would be designated the leading brake shoe. Because the rotation of the brake drum in the direction described requires that a larger braking force be applied to the trailing shoe, as compared with the leading shoe, there is a greater reaction caused by the greater force acting on the trailing brake shoe, and that reaction operates to urge wedge 84 sideways, relative to the axis of push rod 74, in a direction toward the leading brake shoe. However, because of the guide surface 112 defined by reaction plate 110, and the guide rollers 106, 108 between the guide surface and guide surfaces 90 and 92 on wedge 84, excessive reaction force, which would otherwise be transmitted to the leading brake shoe is avoided, thereby providing more uniform braking action between the leading and trailing brake shoes, with consequent more even brake shoe wear than if the guide rollers and guide roller surfaces were not provided. Furthermore, because most vehicles perform most of their movement in what is designated as a forward direction, the provision of the guide rollers only on the leading shoe side of the brake drum permits a smaller volume of parts to be provided within the brake drum, and permits the invention to be incorporated into smaller diameter brake drums thereby rendering it applicable for smaller vehicles, such as automobiles.

The arrangement for the proper guiding of the push rod along the push rod axis as shown and described is preferred as the most suitable under the circumstances, but many other practical solutions are conceivable.

Throughout this specification the expression "push rod" has been used to identify the means for introducing a brake force from a brake cylinder to plungers that act upon the brake shoes. However, it will be apparent to those skilled in the art that is is an easy task to modify any structure of this kind to include a "pull rod" as a modification, which is intended to be included in the scope of the claims. Also, other means than the smooth-surfaces rollers 32, 35 and 94, for transmitting the forces are conceivable, for example pinions between rack-shaped surfaces.

A perpendicular force transmission between the push rod and the plungers has been presumed, but deviations from exact perpendicularity are possible.

Although particular embodiments of the present invention have been illustrated and described, it will be apparent to those skilled in the art that various changes and modification can be made without departing from the spirit of the invention. Accordingly, it is intended to encompass within the appended claims all such changes and modifications that fall within the scope of the present invention.

What is claimed is:

1. Brake shoe operation apparatus for actuating pivotable brake shoes carried within a rotatable brake drum, said apparatus comprising:
   a. housing means;
   b. a pair of opposed, spaced plungers slidably positioned within the housing, each plunger engagable with a respective brake shoe and movable relative to each other along respective plunger movement directions to move the associated brake shoe into braking contact with the brake drum, the plungers each having inner plunger faces inclined to the respective plunger movement directions;
   c. wedge means positioned between the plungers and movable transversely relative to the plunger movement directions along a wedge movement direction, the wedge means including wedge surfaces substantially parallel with and opposed to respective plunger inner faces;
   d. wedge actuating means for moving the wedge in a wedge movement direction;
   e. force transmitting roller means positioned between and in contact with the respective plunger inner faces and the opposed wedge surfaces for rolling contact therewith and for transmitting movement to the wedge means to the plungers to move the plungers relative to the brake drum and cause movement of the brake shoes relative to the brake drum;
   f. stationary guide surface means positioned opposite at least one wedge surface and including a planar stationary guide surface; and
   g. guide roller means positioned on at least one side of the wedge means and between and in rolling contact with the wedge means and with the stationary guide means for guiding movement of the wedge means relative to the guide surface means, wherein the guide roller means include a guide roller axis of rotation, and the guide roller axis of rotation is movable to have a component of motion that is substantially parallel with the wedge movement direction.

2. Apparatus in accordance with claim 1, wherein the guide roller means includes two spaced, co-axial guide rollers, one guide roller positioned on one side of the one force transmitting roller and the other guide roller positioned on an opposite side of the force transmitting roller.

3. Apparatus in accordance with claim 2, wherein the two guide rollers each abut respective opposite ends of the force transmitting roller.

4. Apparatus in accordance with claim 1, wherein the wedge means includes a guide surface opposite to and substantially parallel with the stationary guide surface.

5. Apparatus in accordance with claim 1, wherein the guide surface means are integrally formed with the housing means.

6. Apparatus in accordance with claim 1, wherein the guide surface means is defined by a plate carried within the housing means.

7. Apparatus in accordance with claim 6, wherein the plate is positioned opposite and in contact with the guide roller means and the plate includes an opening through which a force transmitting roller extends to contact a plunger inner face.

8. Apparatus in accordance with claim 1, wherein the guide roller means abut at least one of the force transmitting roller means.

9. Apparatus in accordance with claim 1, including roller cage means wherein the force transmitting roller means and the guide roller means are each rotatably supported in the roller cage means.

10. Apparatus in accordance with claim 9, wherein the roller cage means is carried by the wedge means.

11. Apparatus in accordance with claim 10, wherein the roller cage means includes an end wall that includes an opening for floatingly receiving and supporting a force transmitting roller, and a pair of spaced, opposed side walls that include slots for receiving and supporting a second force transmitting roller for movement in a direction transverse to the wedge movement direction.

12. Apparatus in accordance with claim 1, wherein the guide roller means is positioned on only one side of the wedge means, and is between the wedge means and the plunger that actuates the leading brake show, relative to the drum rotation direction that corresponds with forward movement of a vehicle that carried the braking apparatus.

13. Guide apparatus for wedge operated drum brakes including brake shoes movable toward a brake drum braking surface through plungers operated by the wedge and contacting the brake shoe, said apparatus comprising:
   a. force transmitting roller means positioned between and in contact with the plungers and the wedge for transmitting brake actuation forces from the wedge to each of the plungers by movement of the wedge relative to the plungers; and
   b. wedge guide means including planar support means spaced from the wedge, and guide roller means positioned between and in contact with the wedge and the support means for guiding movement of the wedge relative to the support means, wherein the guide roller means include a guide roller axis of rotation, and the guide roller axis of rotation is movable to have a component of motion that is substantially parallel with the wedge movement direction.

14. Brake actuation apparatus for actuating drum brakes, wherein brake shoes are urged against an inner surface of a rotatable brake drum to provide a braking force, said apparatus comprising:
a. a housing;
b. push rod means movable within the housing to and from a brake actuation position, the push rod means carrying wedge means;
c. operating means for moving the push rod means relative to the housing;
d. brake show actuation means carried within the housing for engagement with the brake shoes and with the wedge means;
e. rotatable force transmitting means positioned between the wedge means and the brake shoe actuation means for transmitting movement of the push rod means to the brake shoe actuation means for moving the brake shoes into contact with the brake drum; and
f. guide means carried within the housing for guiding and supporting the wedge means for movement parallel to the axis of the push rod means in response to reaction forces from the brake shoes actuation means, the guide means positioned between the wedge means and the brake shoe actuation means, and including a planar guide surface carried by the housing, and guide roller means positioned between the guide surface and the wedge means, wherein the guide roller means include a guide roller axis of rotation, and the guide roller axis of rotation is movable and has a component of motion that is substantially parallel with the direction of movement of the push rod means.

15. A wedge and roller actuator comprising:
a housing having a first bore and a second bore extending at right angles to the first bore;
opposed tappets provided in the second bore and having respective actuating surfaces;
a wedge movable along a line of action and disposed between the opposed tappets, the wedge having actuating surfaces; and
roller means disposed respectively at either side of the wedge, said roller means including force transmitting rollers to transmit actuating thrust from the actuating surfaces of the wedge to the actuating surfaces of the tappets, at least one of said roller means being in rolling contact with and in force-transmitting relationship with an abutment surface fixed relative to the housing on one side of the wedge in order to transmit to said abutment surface inwardly directed forces arising on the tappet associated with the force transmitting roller on the opposite side of the wedge, wherein the abutment surface is a planar surface, and wherein the at least one roller means includes a roller axis of rotation, and the roller axis of rotation is movable and has a component of motion that is substantially parallel with the wedge line of action.

16. Brake shoe operation apparatus for actuating pivotable brake shoes carried within a rotatable brake drum, said apparatus comprising:
a. housing means;
b. a pair of opposed, spaced plungers slidably positioned within the housing means, each plunger operable to actuate a respective brake shoe and movable relative to each other along respective plunger movement directions to move an associated brake shoe into braking contact with the brake drum, the plungers each having inner plunger faces inclined to the respective plunger movement directions;
c. wedge means positioned between the plungers and movable transversely relative to the plunger movement directions along a wedge movement direction, the wedge means including a pair of wedge surfaces, each wedge surface facing a respective plunger inner face;
d. wedge actuating means for moving the wedge means in the wedge movement direction;
e. roller means positioned on opposite sides of the wedge means, the roller means including force transmitting rollers positioned between and in contact with each of the plunger inner faces and the respective wedge surfaces for rolling contact therewith and for transmitting movement of the wedge means to the plungers as the wedge means moves along the wedge movement direction to move the plungers relative to the brake drum and in the plunger movement directions to cause movement of the brake shoes relative to the brake drum;
f. stationary guide surface means spaced from the facing the wedge means and including a planar stationary guide surface facing the wedge means;
g. wherein the roller means includes roller surface means positioned between and in rolling contact with the stationary guide surface and with the wedge means for guiding movement of the wedge means relative to the guide surface means, wherein the roller surface means include a roller axis of rotation and the roller axis of rotation is movable and has a component of motion that is substantially parallel with the wedge movement direction.

* * * * *